March 29, 1960      J. H. BIGELOW      2,930,457
ELECTROMAGNETICALLY RELEASABLE BRAKE
Filed April 21, 1958      4 Sheets-Sheet 1

Inventor
James H. Bigelow
By H R Ratter
Attorney

March 29, 1960   J. H. BIGELOW   2,930,457
ELECTROMAGNETICALLY RELEASABLE BRAKE
Filed April 21, 1958   4 Sheets-Sheet 2

Inventor
James H. Bigelow
By H R Rather
Attorney

March 29, 1960     J. H. BIGELOW     2,930,457
ELECTROMAGNETICALLY RELEASABLE BRAKE
Filed April 21, 1958     4 Sheets-Sheet 3
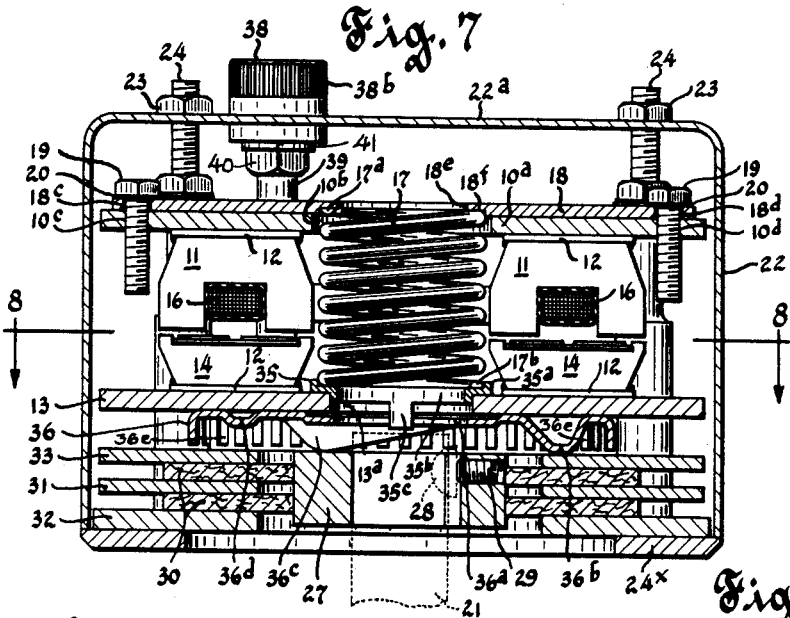
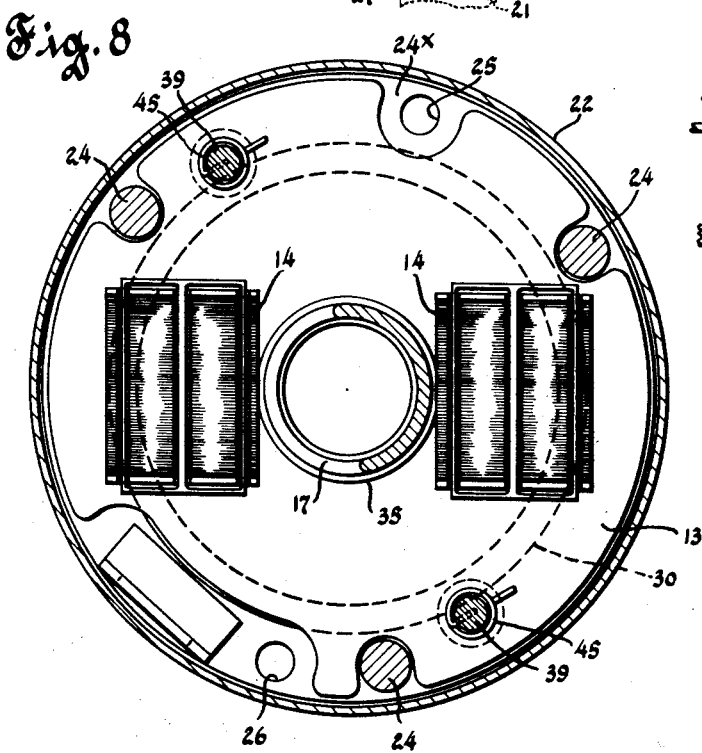
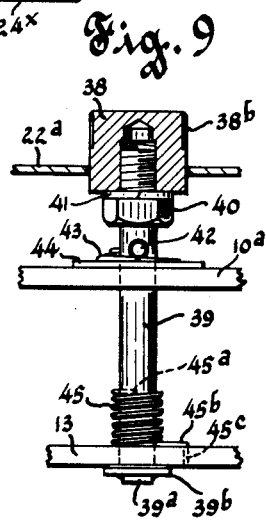
Inventor
James H. Bigelow
By H R Reiter
Attorney

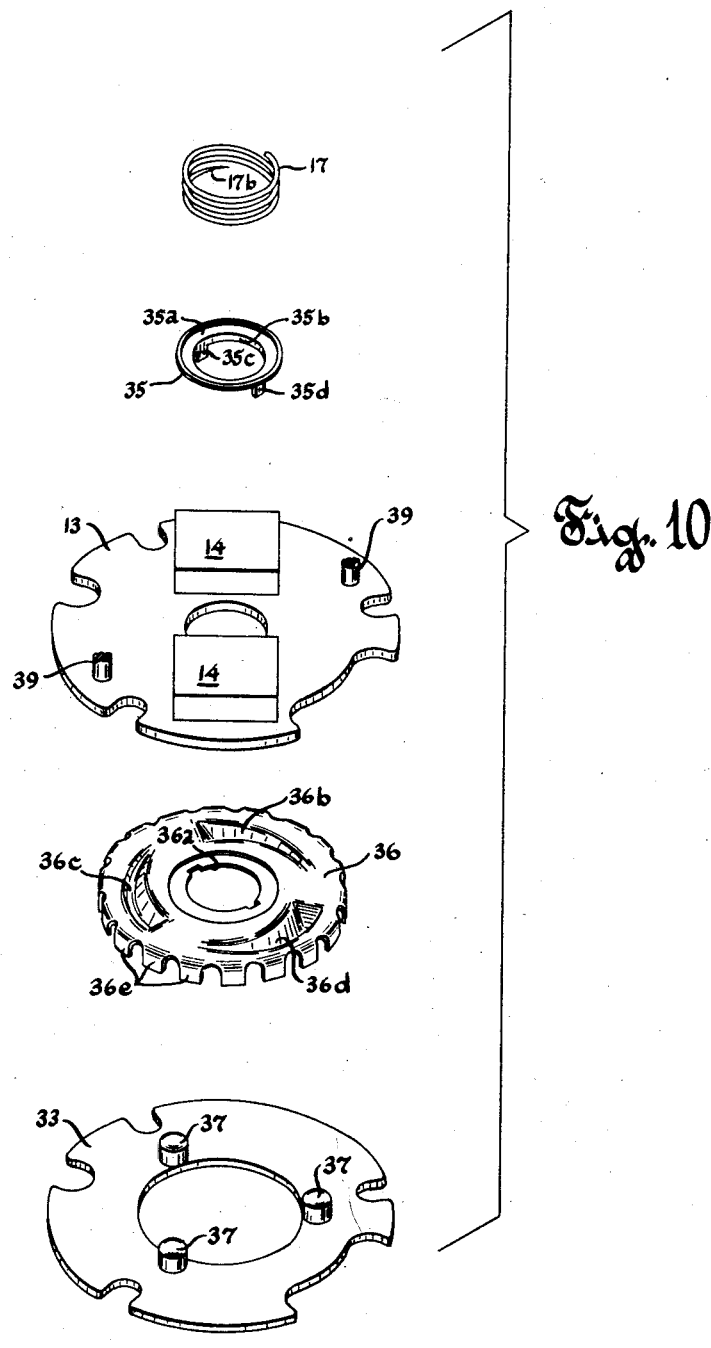

United States Patent Office 2,930,457
Patented Mar. 29, 1960

2,930,457

ELECTROMAGNETICALLY RELEASABLE BRAKE

James H. Bigelow, Milwaukee, Wis., assignor to Cutler-Hammer, Inc., Milwaukee, Wis., a corporation of Delaware Application April 21, 1958, Serial No. 729,612

3 Claims. (Cl. 188—171)

This invention relates to improvements in direct acting, motor mounted, disc type, electromagnetically releasable brakes.

An object of the invention is to improve the mechanical structure and the electrical operating characteristics of such brakes.

Another object is to improve the electro-mechanical operating characteristics of such brakes whereby proper electrical and mechanical cooperation of the parts thereof is insured, including elimination of any tendency of the electromagnetically operated parts to hum or chatter, or to otherwise fail to function properly upon energization of the electromagnetic elements thereof.

Another object is to provide a motor mounted housing for such brakes wherein the motor armature shaft may, if desired, extend centrally to a point adjacent the outer end wall of the housing, or entirely through and beyond the latter, without interference with any of the other parts of the complete device.

Another object is to provide such a normally applied, electromagnetically releasable motor mounted brake which is simple in construction and trustworthy in operation.

Other objects and advantages of the invention will hereinafter be referred to.

The accompanying drawings illustrate a preferred embodiment of the invention, which will now be described, it being understood that various modifications may be made in the embodiment illustrated without departing from the spirit and scope of the appended claims.

In the drawings, Figures 1, 2 and 3 illustrate somewhat diagrammatically, certain parts of a known form of electromagnetically releasable braking means of the general character herein contemplated, but without my improved and modified cooperating elements substituted therefor and/or added thereto;

Fig. 4 likewise illustrates, more or less diagrammatically, the manner in which a device like that shown in Figs. 1, 2 and 3 may be modified to provide for attainment of the novel and improved operating characteristics of a motor mounted brake mechanism of the character herein disclosed;

Fig. 7 is a sectional view on the line 7—7 of Fig. 5, at a right angle to the view in Fig. 6, looking in the direction of the arrows;

Fig. 8 is a transverse sectional view, on the line 8—8 of Fig. 7, looking in the direction of the arrows; and Fig. 9 is a fragmentary sectional view, on the line 9—9 of Fig. 5, looking in the direction of the arrows, showing the mechanical construction and arrangement of the parts of one of the pair of like jointly operable, manual releasing elements for the brake mechanism.

Fig. 10 is an exploded isometric view illustrating certain parts of the invention shown in Figs. 6 and 7.

Figure 1:
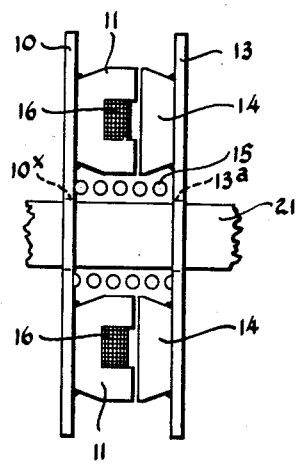
Figure 2:
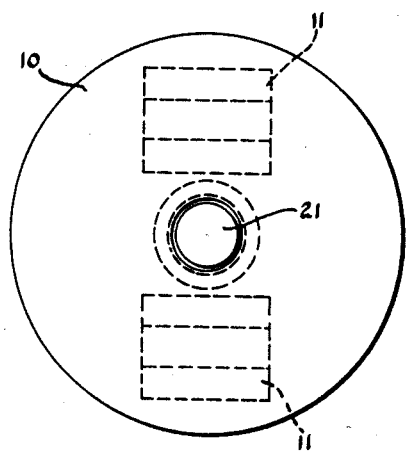
Figure 3:
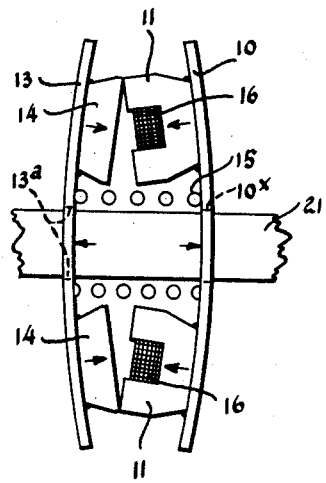

Referring first to Figs. 1, 2 and 3 of the drawings, the same illustrate, more or less diagrammatically, certain essential parts of a motor mounted disc brake of a known type, but which lacks the important structural and operating characteristics of my improved brake mechanism. In said Figs. 1 to 3 the numeral 10 designates the circular field piece of a known form of motor mounted, direct acting, disc type brake. Field piece 10, preferably punched to the circular form illustrated from a flat steel plate, having a circular opening formed centrally therein to afford clearance for motor shaft 21, has attached to the inner surface thereof, as by welding, two diametrically oppositely arranged stacks of laminations 11 of magnetizable metal, the two forms of laminations being punched or otherwise formed to the shape thereof best illustrated in Figs. 1 to 4 and 7, the laminations in each of the respective stacks being likewise preferably welded to each other in a well known manner. In practice, the stacks of laminations 11, 11 are preferably welded, or otherwise rigidly attached, to the respective flat steel plates 12, 12, of proper size, and of substantially rectangular shape, as indicated in Fig. 7; and said plates 12, 12 are thereafter attached, as by welding, to said field piece 10.

The circular armature plate, shown at 13 in various figures of the drawings, is provided with a pair of diametrically oppositely arranged stacks of laminations 14, 14 the individual plates of which laminations as shown in Fig. 7, are welded to each other, and to a pair of steel plates 12, 12, respectively, like those aforementioned, which plates 12, 12 are then welded to said armature plate 13.

In a known form of direct acting disc brake of this general character as heretofore constructed, and as illustrated in Figs. 1, 2 and 3, the usual heavy gauge high pressure type coiled compression spring 15 was interposed directly between and engaged with the opposed inner surfaces of the relatively heavy gauge, but flexible circular metal plates 10 and 13, as best illustrated in Figs. 1 and 3, thus normally acting directly to bias the armature assembly 13, 14, 14 away from the field piece, designated by the numerals 10, 11, 11, and the single magnet coil 16 associated therewith.

It was found that an assembly of parts like that illustrated in Figs. 1, 2 and 3 invariably hummed, or chattered, quite loudly as an incident to energization of the magnet coil 16 (Figs. 1 and 3). This undesirable characteristic was initially assumed to possibly be due to distortion of the stacked plates 11, 11 of the field piece 10, and of the stacked plates 14, 14 of armature 13, during grinding of the sealing surfaces thereof. Such distortion of the stacked plates was avoided by employment of a suitable fixture during grinding of the sealing surfaces. Nevertheless the magnet parts continued to hum loudly.

It was therefore concluded that the humming or chattering of the magnet parts was due to distortion of the plates 10 and 13 in the manner shown, more or less diagrammatically, in Fig. 3. The actual degree of distortion cannot be seen by ordinary observation. The manner in which the problem was solved is illustrated, somewhat diagrammatically, in Fig. 4, wherein a coiled compression spring 17 of greater length than the aforementioned spring 15, but of substantially the same operating strength as the latter, has its left-hand end seated against the inner surface of the flexible circular metal armature plate 13, in the same manner as illustrated in Figs. 1 and 3. However, as shown in Fig. 4, the modified form of the plate 10a, forming a part of the field piece of the electromagnet, is provided with a circular opening 10b of a size to afford clearance for free movement of the relatively longer coiled compression spring 17 therethrough.

Figure 4:
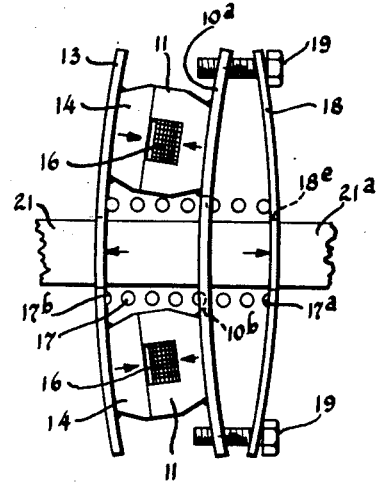
Figure 5:
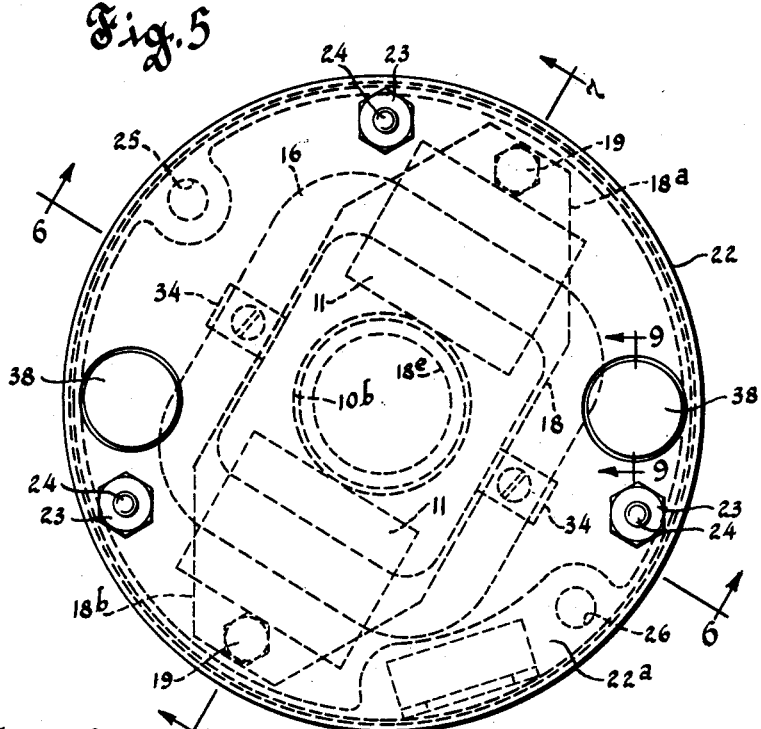
Fig. 5 is an outer end view of my improved motor mounted electromagnetically releasable braking mechanism, with various internal elements thereof shown in dotted lines.
Figure 6:
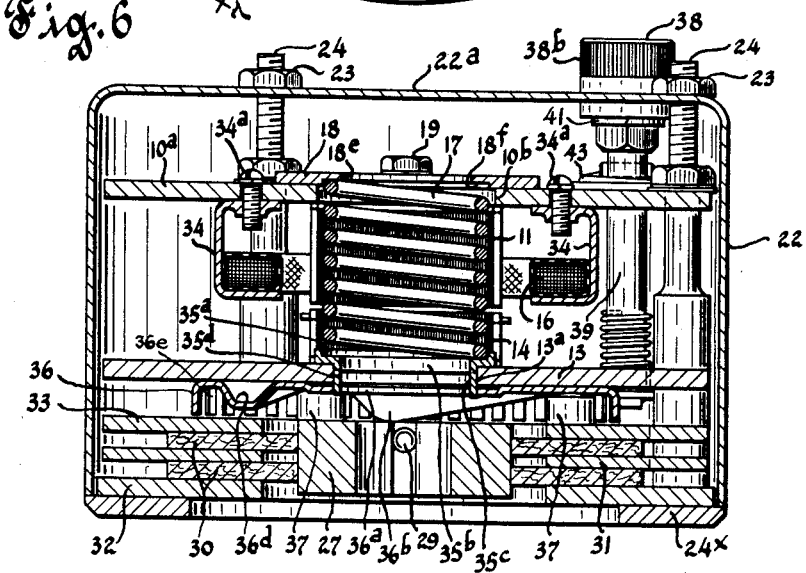
Fig. 6 is a sectional view of the complete device, the section being taken on the line 6—6 of Fig. 5, looking in the direction of the arrows.

The right-hand end of the relatively longer coiled compression spring 17 shown in Fig. 4 is adapted to abut against the inner surface of a normally flat resilient sheet metal member 18, as shown in Figs. 6 and 7, and as indicated in dotted lines in Fig. 5, which member 18 serves as a spring gland. The intermediate portion of the length of said spring gland 18, as shown in Fig. 5, is preferably of substantially rectangular contour, and the opposite end portions 18a and 18b thereof are preferably of approximately frusto-conical shape or contour. Said end portions 18a and 18b, as best illustrated in Fig. 7, are provided with openings 18c and 18d to afford clearance for the threaded shanks of bolts 19, 19 which bolts take into threaded openings 10c and 10d in the opposite end portions of the aforementioned field piece 10.

As will be apparent from consideration of the diagrammatic illustration in Fig. 4, in conjunction with the actual structure as shown in Figs. 5 to 8, inclusive, upon energization of the magnet coil 16 the laminated metal members 14, 14 attached to and forming a part of the armature 13, are attracted toward the respective laminated metal members 11, 11 in a manner generally similar to that diagrammatically illustrated in Fig. 3. However, due to the provision of the relatively larger, centrally located, circular opening 10b provided in the plate 10a of the modified form of field piece, the intermediate coils of said relatively longer spring 17 are afforded clearance for unobstructed movement therethrough in both directions, the right-hand end of said relatively longer spring (Fig. 4) being adapted to continuously engage the inner surface of the aforementioned spring gland 18, around the clearance opening 18e located centrally thereof to freely accommodate a projecting portion 21a of the motor shaft 21.

As will be apparent from consideration of Fig. 7, in which the field piece 10a is shown in its upper extreme position, it is possible, by merely rotating the heads of bolts 19, 19 in the proper direction, from a given intermediate position of adjustment thereof (not shown) to effect a predetermined degree of raising or lowering of the spring gland 18, which changes the degree of torque exerted by the brake.

As shown in Figs. 4 to 8, inclusive, the shafts 21 of a motor, to which the brake mechanism is to be attached, may extend into the direct acting disc brake attachment to any desired degree within the limit determined by the outer end wall 22a of the brake cover member 22, by reason of the clearance afforded by spring 17, the opening 10b provided in field piece 10, and the opening 18e located centrally of said spring gland 18.

Referring particularly to the showing of my improved direct acting motor mounted disc type brake in Fig. 4, and to the more detailed showing thereof in Figs. 5 to 9, inclusive, it may be assumed that all of the parts shown in Figs. 5, 6 and 7, for example (with the exception of the three external nuts 23 shown in Fig. 5, and two of which are shown in each of Figs. 6 and 7), have been assembled upon the three upwardly projecting metal studs 24, the lower ends of which are rigidly attached to the mounting or base plate 24x, as by means of threaded bolts (not shown) taking into upwardly extending tapped recesses formed in the lower ends of the respective studs, and rigidly attaching said studs to said mounting plate 24x.

The mounting plate 24x is provided near its periphery with a pair of diametrically opposed openings, as shown in full lines at 25 and 26 in Fig. 8 (and in dotted lines in Fig. 5), whereby the same may be attached directly to a motor housing or alternatively to a known form of metal adapter member (not shown), which adapter member may thereafter be bolted to the motor housing, suitably formed or prepared for accommodating the same.

As will be apparent from consideration of Fig. 7, prior to assembly of the various parts as aforedescribed, it is necessary that the ring-shaped metal member or hub 27 be rigidly and non-rotatably connected with the protruding end portion 21 of the motor shaft, as by means of the key member, shown in dotted lines at 28, and fitting into a straight groove formed longitudinally in said end portion of the shaft, said key member 28 being retained in interlocked relationship to said members 21 and 27 by means of the set screw 29.

Hub member 27 has peripherally attached thereto in any suitable or well known manner, for rotation therewith, a plurality of frictional braking discs 30, 30 of suitable material for the purpose, with a flat, ring-shaped metal braking member 31 interposed therebetween, it being understood that in the particular form of the device herein illustrated a pair of additional ring-shaped metal plates 32 and 33 are preferably employed, one positioned below the lower brake disc 30, and the other positioned above the upper brake disc 30, as shown in Figs. 6 and 7.

As best illustrated in Figs. 6, 7 and 8, all of the metal plate members 10, 13, 33, 31 and 32 have non-rotatable interlocking engagement with the three metal stud members 24, 24, 24, which stud members are respectively rigidly attached to the base plate 24x, as aforestated, to positively restrain said plate members against relative rotation.

With the parts of my improved direct acting motor mounted disc type electromagnetically releasable brake assembled as shown in Figs. 6 and 7, with the hub 27 thereof attached to the outwardly projecting portion 21 of the motor shaft, as shown in dotted lines in Fig. 7, and with the electromagnetic winding 16 of the field piece 10a supported in proper position, in the areas thereof between the stacks 11, 11 of laminations, as by means of suitable metal supporting brackets 34, 34, attached by screws 34a, 34a to the inner surface of said field piece 10a (Figs. 5, 6 and 7).

As best illustrated in Figs. 4, 6 and 7 the aforementioned coiled compression spring 17 has its upper and lower ends ground flat, the flat upper end portion thereof being designated by the numeral 17a and the flat lower end portion thereof being designated by the numeral 17b (Fig. 7).

Also as shown in Figs. 6 and 7, the upper end of the spring 17 is adapted to seat against the inwardly facing annular undercut surface 18f, which surrounds the inner end of the aforementioned opening 18e and which opens to the inner surface of said spring gland 18. The flattened lower end 17b of spring 17 (Figs. 6 and 7) is adapted to seat within the shallow cup-shaped portion 35a of a punched and stamped sheet metal member 35, the tubular lower end portion 35b of which is provided with a pair of diametrically opposed integral, substantially rectangular extensions 35c and 35d, which are respectively adapted for interlocking engagement with a diametrically opposed pair of correspondingly shaped notches formed in the periphery of said circular opening 36a located centrally of said brake applying and brake releasing member 36.

Said member 36 is provided with a group of three downwardly projecting hollow cam-shaped foot portions, respectively designated by the numerals 36b, 36c and 36d. As best illustrated in Fig. 10, the upper surface of the plate 33 has attached thereto, as by welding, a group of three equally spaced wear resisting metal studs 37 against the convex free end portions of which said cam-shaped foot portions 36b, 36c and 36d are respectively adapted to press simultaneously upon deenergization of the aforementioned brake releasing coil 16.

As shown in Figs. 6, 7 and 10, the outer periphery of brake releasing member 36 is provided with radially spaced tabs 36e. Tabs 36e may be engaged with a suitably formed tool (not shown) to rotate member 36 relative to studs 37 thereby causing the cam-shaped foot portions 36b, 36c, and 36d, respectively, to override an associated stud 37. In this manner, plates 33 may be selectively urged, through the coaction of the aforementioned cam-shaped foot portions and studs, toward braking member 31 to cause brake discs 30 to be tightly compressed between plates 31, 32 and 33, respectively. Thus it is seen that member 36 may be rotated in a step-by-step manner to provide a simple adjusting means for compensating for a decrease in the thickness of brake discs 30 due to wear.

In practice the arrangement is such that upon energization of the motor for operation thereof in a normal manner the brake releasing winding or coil 16 will be simultaneously energized, to effect retraction of the armature plate 13, against the brake applying bias of the coiled compression spring 17, thus permitting the motor to operate in a given direction in a normal manner, whereas upon interruption of the motor circuit connections the aforementioned magnet coil 16 will likewise be deenergized, to thereby effect application of a braking force, under the biasing action of the coiled compression spring 17, to the various braking elements 30, 31, 32, 33, 36 and 37, acting through the medium of the hub member 27 attached to the shaft of the particular motor, to insure rapid stopping of the latter, thereby avoiding any likelihood of damage to parts driven by the motor, or injury to the attending operator or operators of the motor.

In practice I also prefer to provide manual means for affording release of the braking torque from the shaft of the motor, to thus permit free rotation of the motor shaft, to which the aforementioned hub 27 (Figs. 6 and 7), and its associated braking elements 30, 36 are attached.

Said manually operable brake releasing means preferably comprises a spaced pair of like diametrically oppositely positioned manually operable knobs 38, 38 of cylindrical form, the major portion of the length of each of which projects outwardly through a pair of circular clearance openings provided therefor in the outer end wall 22a of cover member 22. A portion of the length of each knob, at the outer end thereof is vertically grooved, or otherwise roughened, peripherally, as shown at 38b, to facilitate manual gripping and rotation thereof by the hands of the operator.

The structural and operative characteristics of the pair of manually operable brake releasing devices 38, 38 are best illustrated in the fragmentary view of Fig. 9, and at the right-hand side of Fig. 6. Thus it will be understood from the disclosure in Fig. 9, that each shaft 39, preferably of circular form in cross section, extends from a point above the flat surface 22a of cover member 22, through a clearance opening in the plate 10a forming a part of the field piece, and thence through an opening provided therefor in the armature plate 13. The inwardly extending end portion 39a of shaft 39 has attached thereto in any suitable manner an enlargement or plate 39b, whereby any upward movement of the shafts 39, from the normal positions thereof, respectively, results in a corresponding degree of upward movement, or displacement, of the armature plate 13, thus forcibly counteracting the brake applying effect on armature plate 13, of the aforementioned biasing spring 17 (Figs. 6 and 7).

The manner in which the manually operable brake releasing parts are assembled is best illustrated in Fig. 9 from which it will be understood that a predetermined length of the upper end of shaft 39 is provided with a screw-thread onto which end the nut 40 is turned to the predetermined position thereof illustrated, whereupon a lock washer 41 is inserted around the threaded upper end portion of said shaft, to seat against nut 40. Thereupon the internally threaded, manually operable knob 38 is threaded onto said upper end of shaft 39, until the flat lower end of said knob is tightly and non-rotatably seated against the upper surface of said lock washer 41, to tightly and non-rotatably attach said parts for rotary movement simultaneously with each other. As shown in Fig. 9, shaft 39 has rigidly attached thereto, and projecting laterally therefrom, a pin 42, which is preferably of circular form in transverse cross section, which pin 42 may have a screw threaded connection with a laterally opening recess in shaft 39, or it may be connected thereto by a drive fit thereof within said laterally opening recess in said shaft.

As shown in Fig. 9, each of the pair of shafts 39, 39 has its aforementioned laterally projecting pin 42 properly positioned with respect to a cooperating cam member 43, as shown, whereby upon manual rotation of the knobs 38, 38 simultaneously, in a clockwise direction, for example, the pair of like cams 43, each having a like fixed position with respect to cooperating shaft pin 42, will result in a joint lifting action thereof upon the aforementioned plate 13, whereby the brake applying bias of spring 17 on plate 13 is nullified. As shown in Fig. 9, each cam member 43 is formed integrally with, or welded or otherwise permanently attached to, a flat plate-like member or portion 44, which member 44 may be riveted, welded or otherwise permanently attached to the upper surface of said field piece 10a aforementioned.

As shown in Fig. 9, each of the shafts 39 has associated therewith a coiled torsion spring 45, the upper end 45a of which has interlocking engagement with an opening extending into shaft 39. The lower end portion 45b of spring 45 extends laterally from the coiled portion thereof and then downwardly, as shown at 45c, for interlocking engagement with an opening 13a formed in armature plate 13. Thus, upon release of the knobs 38, 38, the manual releasing parts will be automatically returned to their normal positions, shown in Figs. 6 and 7.

Although I have herein illustrated an electromagnetic braking device embodying two diametrically oppositely arranged groups of electromagnetic brake releasing elements, it will be apparent to those skilled in the art that three or more equally spaced groups of such electromagnetic brake releasing elements may be employed, if found necessary or desirable.

Moreover, although I have herein illustrated the use of a spring gland 18 attached at only two spaced points, whereby said gland causes a cylindrical deflection of the field and armature plates, use of three or more points of attachment of the spring gland will result in a substantially spherical deflection of the field and armature plates, with improved operating characteristics of such devices, in respect of quietness of operation, particularly when three or more sets of field and armature members of the character shown at 11 and 14 in the drawings are employed.

I claim:

1. In a motor-mounted, spring applied brake, in combination, a pair of metal plates non-rotatably associated with a stationary motor housing in spaced, parallel relationship to each other, a coiled compression spring having one end abutting a first plate of said pair and another end extending through an opening in a second plate of said pair, said other end of said spring abutting a plate member secured to said second plate and overlying said opening, said spring normally biasing said first plate toward a rotatable braking member rigidly attached to a motor shaft to effect braking torque upon the latter, and said pair of plates and said plate member resiliently coacting to maintain said pair in parallel relationship upon compression of said spring to release the brake.

2. The invention defined in claim 1, together with brake applying means positioned between said first plate and said rotatable braking member comprising a multiple cam-footed member and a braking plate, said braking plate being non-rotatable relative to said braking member and normally exerting braking torque upon the latter in response to the bias of said spring and having a plurality of studs rigidly attached thereto, said cam-footed member being rotatable relative to said braking plate and coaxially positioned between the latter and said first plate, said cam-footed member further having cam portions engageable with said studs upon rotation of said cam-footed member to vary the aforementioned braking torgue.

3. In a motor mounted, electromagnetically releasable brake, in combination, a pair of parallel, spaced metal plates non-rotatably associated with a stationary motor housing, a coiled compression spring having one end abutting a first plate of said pair and another end extending through an opening in a second plate of said pair, said other end of said spring abutting a plate member secured to said second plate and overlying said opening therethrough, said spring normally biasing said first plate toward a braking member non-rotatably secured to a rotatable motor shaft to effect application of breaking torque upon said shaft, said first plate having a plurality of electromagnetic field members rigidly attached thereto, a corresponding number of armature members rigidly attached to said second plate in opposed relationship to said field members and said spring and said plate member resiliently coacting with each other and with said first and second plates to maintain a parallel relationship between the latter thereby insuring a positive seal between said armature members and said field members upon energization of the latter to compress said spring.

References Cited in the file of this patent
UNITED STATES PATENTS

| | | |
|---|---|---|
| 2,009,121 | Price | July 23, 1935 |
| 2,059,028 | Price | Oct. 27, 1936 |
| 2,700,439 | Hodgson | Jan. 25, 1955 |
| 2,851,129 | Doerries | Sept. 9, 1958 |